(12) United States Patent
Miller et al.

(10) Patent No.: US 10,155,551 B2
(45) Date of Patent: Dec. 18, 2018

(54) CONTROLLER TO QUICKLY RAISE AND SLOWLY LOWER AN AIR DAM

(71) Applicant: FORD GLOBAL TECHNOLOGIES, LLC, Dearborn, MI (US)

(72) Inventors: Kenneth James Miller, Canton, MI (US); Daniel Mark Schaffer, Brighton, MI (US); Christopher James Hocking, Dearborn, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 209 days.

(21) Appl. No.: 15/417,926

(22) Filed: Jan. 27, 2017

(65) Prior Publication Data
US 2017/0137074 A1 May 18, 2017

Related U.S. Application Data

(63) Continuation of application No. 14/618,189, filed on Feb. 10, 2015.

(51) Int. Cl.
| | | |
|---|---|---|
| *B62D 35/02* | (2006.01) | |
| *B62D 35/00* | (2006.01) | |
| *G05D 3/10* | (2006.01) | |
| *G01S 13/93* | (2006.01) | |
| *G01S 15/93* | (2006.01) | |

(52) U.S. Cl.
CPC .......... *B62D 35/005* (2013.01); *B62D 35/02* (2013.01); *G05D 3/10* (2013.01); *G01S 2013/9389* (2013.01); *G01S 2015/938* (2013.01)

(58) Field of Classification Search
CPC ........ G05D 3/10; G05D 1/021; B62D 35/005; B62D 35/02; B62D 37/02
USPC .......................................................... 701/49
See application file for complete search history.

(56) References Cited

U.S. PATENT DOCUMENTS

| | | |
|---|---|---|
| 4,119,339 A | 10/1978 | Heimburger |
| 4,489,806 A | 12/1984 | Shimomura |
| 4,810,022 A | 3/1989 | Takagi et al. |
| 4,951,994 A | 8/1990 | Miwa |
| 5,458,391 A | 10/1995 | Ito et al. |
| 6,079,769 A | 6/2000 | Fannin et al. |
| 6,286,893 B1 | 9/2001 | Presley |
| 6,886,883 B2 | 5/2005 | Jacquemard et al. |
| 7,780,223 B2 | 8/2010 | Kottenstette et al. |
| 8,060,275 B2 | 11/2011 | Asgari et al. |
| 8,186,746 B2 | 5/2012 | Mackenzie et al. |
| 8,702,152 B1 | 4/2014 | Platto et al. |
| 8,887,845 B2 | 11/2014 | McDonald et al. |

(Continued)

*Primary Examiner* — Hilary L Gutman
(74) *Attorney, Agent, or Firm* — Jason Rogers; King & Schickli PLLC

(57) ABSTRACT

A front air dam assembly for a vehicle includes a translatable front air deflecting panel for altering an airflow beneath the vehicle, a deploying mechanism for translating the front air deflecting panel between a raised position and one or more deployed positions, and a rapid raising mechanism for rapidly raising the front air deflecting panel from the one or more deployed positions. A controller in operative communication with the deploying mechanism and the rapid raising mechanism controls the operation thereof. At least one sensor is included for sending a signal indicative of a road or vehicle condition to the controller. A locking mechanism under the control of the controller is provided for locking the front air deflector panel in the raised or the one or more deployed position.

19 Claims, 9 Drawing Sheets

(56) References Cited

U.S. PATENT DOCUMENTS

| | | |
|---|---|---|
| 9,102,290 B1 | 8/2015 | Cuddihy et al. |
| 2006/0096366 A1 | 5/2006 | Browne et al. |
| 2007/0063541 A1 | 3/2007 | Browne et al. |
| 2007/0216194 A1 | 9/2007 | Rober et al. |
| 2009/0085371 A1 | 4/2009 | Nagahama |
| 2010/0140976 A1 | 6/2010 | Browne et al. |
| 2010/0219661 A1 | 9/2010 | Butlin, Jr. et al. |
| 2011/0260499 A1 | 10/2011 | Li et al. |
| 2012/0001450 A1 | 1/2012 | Li et al. |
| 2012/0153581 A1 | 6/2012 | Li |
| 2012/0330513 A1 | 12/2012 | Charnesky et al. |
| 2016/0229467 A1 | 8/2016 | Miller et al. |

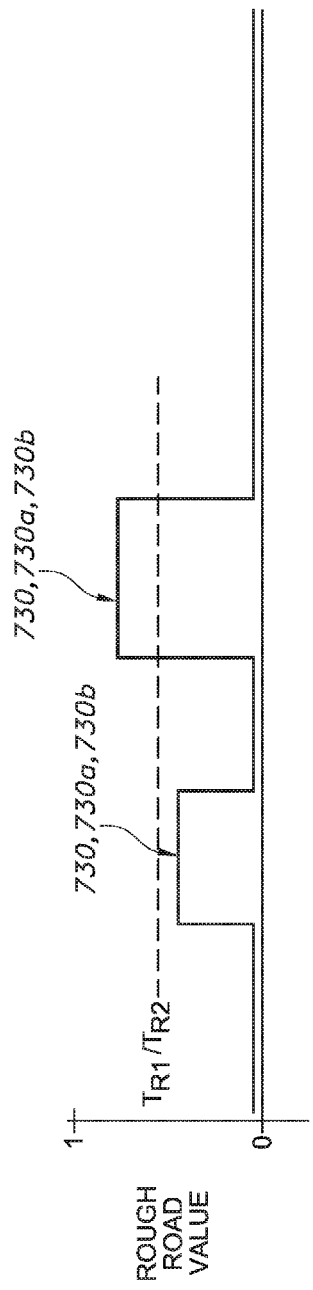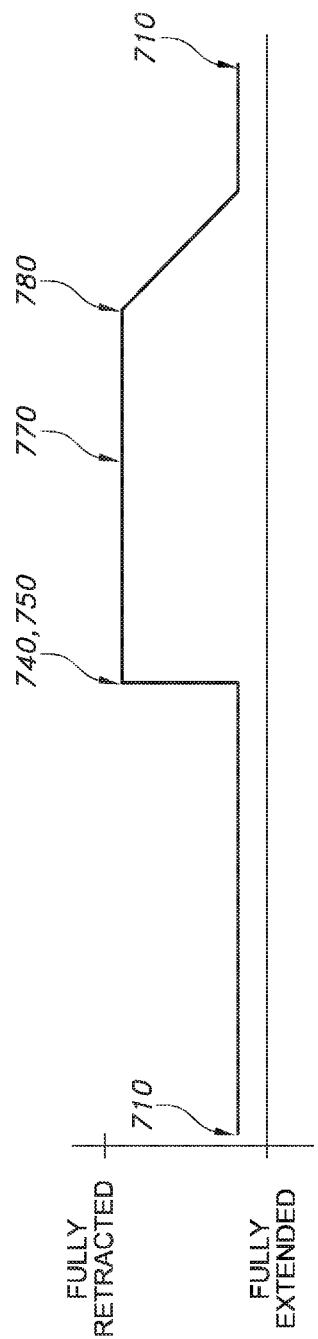

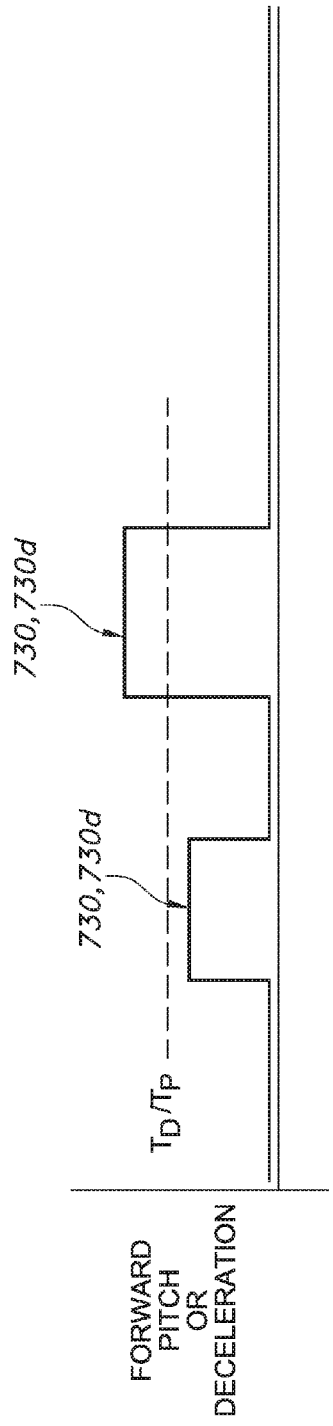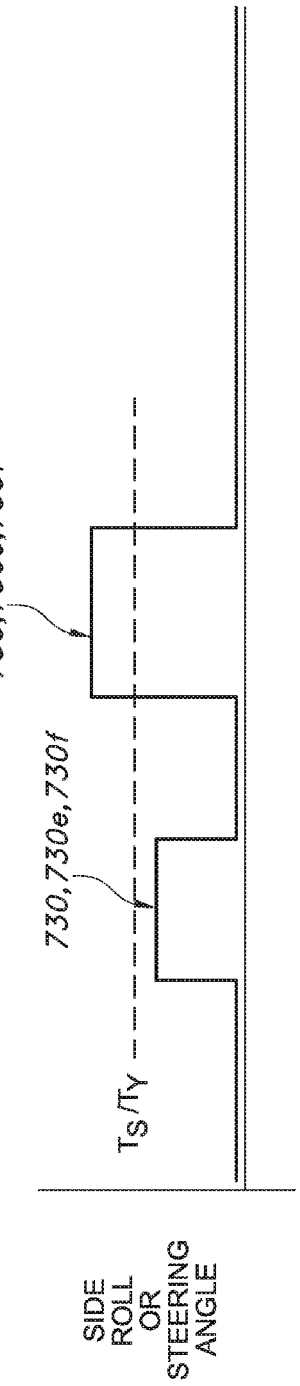

CONTROLLER TO QUICKLY RAISE AND SLOWLY LOWER AN AIR DAM

This utility patent application claims the benefit of priority as a continuation application of U.S. patent application Ser. No. 14/618,189 filed on Feb. 10, 2015, the entirety of the disclosure of which is incorporated herein by reference.

TECHNICAL FIELD

This disclosure relates generally to front air dams for motor vehicles. In particular, the disclosure relates to an aerodynamic translatable front air dam which can be rapidly raised to prevent contact with a road obstacle or a road surface, and to a controller and associated system for operating the air dam.

BACKGROUND

As the speed at which a motor vehicle travels increases, because of differences in airspeed and pressure generated underneath the vehicle chassis relative to the top of the vehicle lift is generated and the nose of the vehicle raises slightly. This can affect handling and stability, particularly for vehicles being operated at higher speeds. This effect on handling and stability can be exacerbated in front-wheel drive vehicles. To address this problem it is known to provide aerodynamic front air dams for motor vehicles, to assist in managing airflow. By use of front air dams, motor vehicle fuel efficiency and passenger cabin acoustics can be improved. Likewise, front air dams assist in limiting motor vehicle front end lift by creating a down-force, forcing the vehicle nose down and so improving vehicle handling and stability. Still more, properly designed front air dams may assist in engine cooling and therefore efficiency.

Of necessity, a front air dam extending below the motor vehicle bumper and chassis reduces ground clearance. This may be of little import when the vehicle is traveling on a smooth road. However, on a rough road or in the event of encountering an obstacle on the road, any reduction in ground clearance may result in vehicle damage and potentially a loss of stability and handling. Even if the vehicle does not actually strike an obstacle in the road, sudden braking or steering may cause the vehicle nose to dip or roll, in turn causing a portion of the front air dam to strike the road surface and cause damage and potential impairment of vehicle stability and handling.

For this reason, it is known in the art to provide retractable front air dams. Such retractable air dams, while effective for their intended purpose, suffer from a flaw. Typically, even in vehicles equipped with forward sensors for detecting obstacles, particularly if the vehicle is traveling at higher speeds, when a road obstacle is encountered only a very limited time to react by braking or steering is available. Likewise, in the event of sudden braking or steering sufficient to cause the vehicle nose to dip or roll, only a very limited time to retract the air dam is available. That limited time may not be sufficient to retract the air dam quickly enough to avoid contact with an obstacle or with the road surface as described above.

To solve this and other problems, the present disclosure relates to a compact and efficient system for lowering and raising a motor vehicle front air dam. The described system also allows raising and lowering the front air dam to a position determined to provide the most efficient height/road clearance in terms of best fuel economy and/or underbody component cooling, but also provides a retraction system allowing rapid retraction of the air dam on detection of a road obstacle or rough road, or on application of heavy braking or steering likely to cause the air dam to contact the road surface.

SUMMARY

In accordance with the purposes and benefits described herein, in one aspect of the disclosure a front air dam assembly for a vehicle is described including a translatable front air deflecting panel for altering airflow beneath the vehicle. A deploying mechanism translates the front air deflecting panel between a raised position and one or more deployed positions, and a rapid raising mechanism rapidly raises the front air deflecting panel from the one or more deployed positions. The assembly further includes a controller in operative communication with the deploying mechanism and the rapid raising mechanism. At least one sensor is provided for sending a signal to the controller indicative of a condition requiring alteration of a height/ground clearance for the translatable air dam. A locking mechanism under the control of the controller locks the front air deflector panel in the raised or the one or more deployed position. In an embodiment, the deploying mechanism is a motor which under the control of the controller operates a gear assembly for translating the front air deflecting panel between the raised position and the one or more deployed positions, and the rapid raising mechanism is a coiled spring such as a torsion spring, configured to rapidly retract the front air deflecting panel from the one or more deployed positions in response to a signal from the at least one sensor to the controller.

In embodiments, at least one sensor is associated with one or more of a temperature sensor system associated with one or more vehicle components, a vehicle braking sensor system, a vehicle steering sensor system, a vibration sensor system, a vehicle suspension sensor system, and a vehicle forward-sensing sensor system. The forward-sensing sensor system may be one or more of a camera-based forward-sensing system, a laser-based forward-sensing system, a sonar-based forward-sensing system, an infrared-based forward-sensing system, an ultrasonic wave-based forward-sensing system, and a radar-based forward-sensing system.

In another aspect of the disclosure, a method is described for deploying a translatable front air dam, comprising providing a front air dam assembly for a vehicle as described above. The controller disengages the locking mechanism, causing the deploying mechanism to place the translatable front air deflecting panel in a first position providing a first ground clearance value, and then engages the locking mechanism. On detection by the at least one sensor of a condition necessitating a rapid retraction of the translatable front air deflecting panel by the rapid raising mechanism, the controller receives a signal indicative of the detected condition from the at least one sensor. Next, the controller calculates a front air deflecting panel second position providing a second ground clearance value that is greater than the first ground clearance value and disengages the locking mechanism. The rapid raising mechanism then rapidly raises the front air deflecting panel to the second position, and the controller engages the locking mechanism. Incorporation of various sensors and forward-sensing sensor systems as described above is contemplated.

In the following description, there are shown and described embodiments of the disclosed rapidly retractable front air dam and methods for using same. As it should be realized, devices and methods are capable of other, different embodiments and their several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed rapidly retractable front air dam, and together with the description serve to explain certain principles thereof. In the drawings:

FIG. 8 illustrates a schematically determination of a threshold rough road value calculation according to the present disclosure to cause a controller to rapidly raise the front air dam assembly;

FIG. 9 illustrates schematically the rapid raising and deployment of a front air dam assembly according to the present disclosure;

FIG. 10 illustrates a schematically determination of a threshold forward pitch or deceleration value calculation according to the present disclosure to cause a controller to rapidly raise the front air dam assembly; and FIG. 11 illustrates a schematically determination of a threshold side roll/yaw or steering angle value calculation according to the present disclosure to cause a controller to rapidly raise the front air dam assembly.

Reference will now be made in detail to embodiments of the disclosed rapidly retractable front air dam, examples of which are illustrated in the accompanying drawing figures.

DETAILED DESCRIPTION

Figure 1:
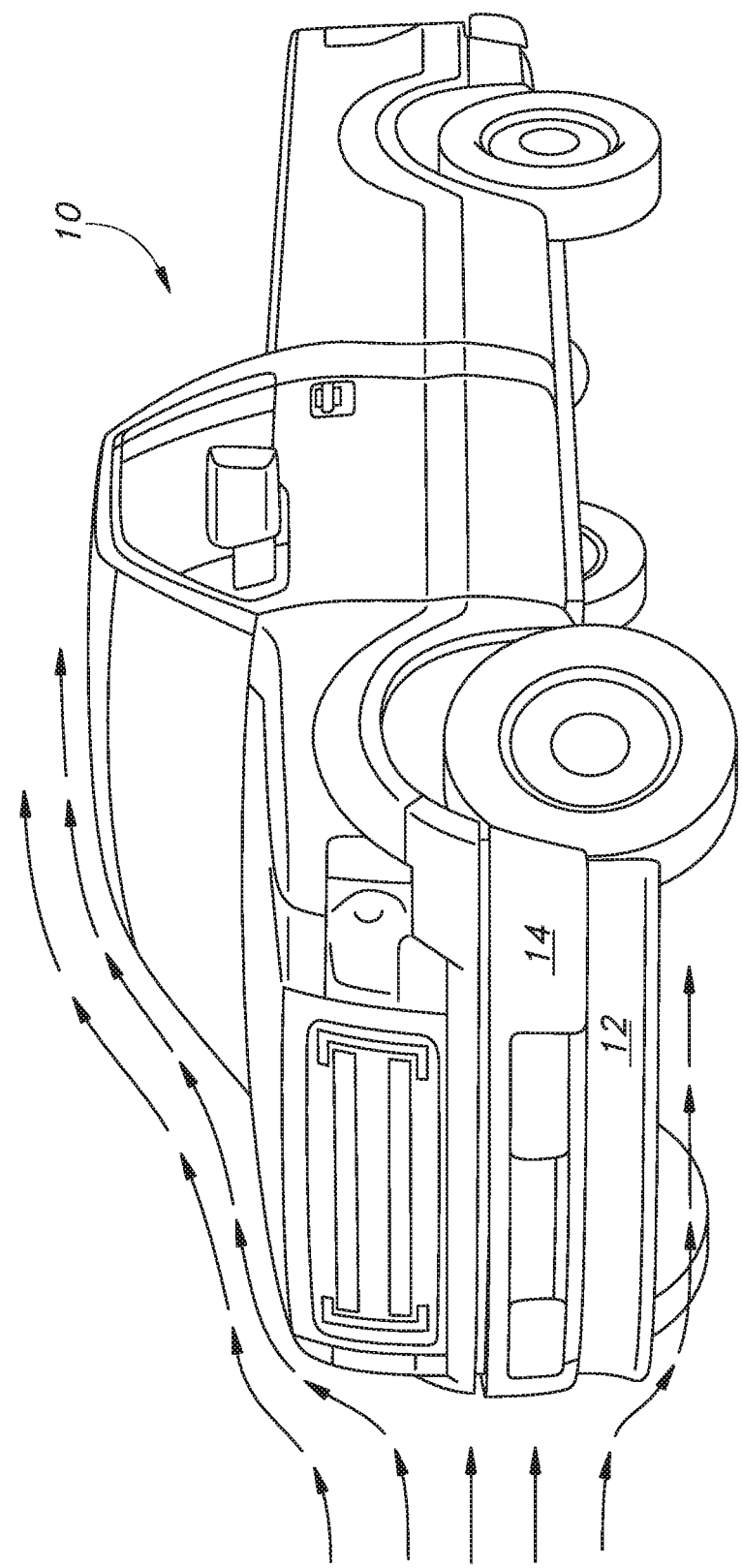
FIG. 1 shows a vehicle including a front air dam.

With reference to FIG. 1, as described above it is known to provide a motor vehicle 10 including an aerodynamic front air dam 12 disposed substantially adjacent and below a vehicle bumper 14 to control airflow (see arrows) below the vehicle 10. The air dam 12 reduces airflow below the vehicle, thereby reducing the tendency of the nose of the vehicle to lift when traveling at speed. Likewise, by use of translatable air dams 12 having a variety of configurations, airflow below the vehicle can be increased or decreased as needed to assist in cooling underbody components.

As is also described above, when traveling on a rough road or in the event of encountering an obstacle on the road, any sudden reduction in ground clearance may cause the air dam to strike the road or obstacle, resulting in vehicle damage and potentially a loss of stability and handling. Even if the vehicle does not actually strike an obstacle in the road, sudden heavy braking or steering may cause the vehicle nose to dip or roll, in turn causing a portion of the front air dam to strike the road surface and cause damage and potential impairment of vehicle stability and handling.

Figure 2:
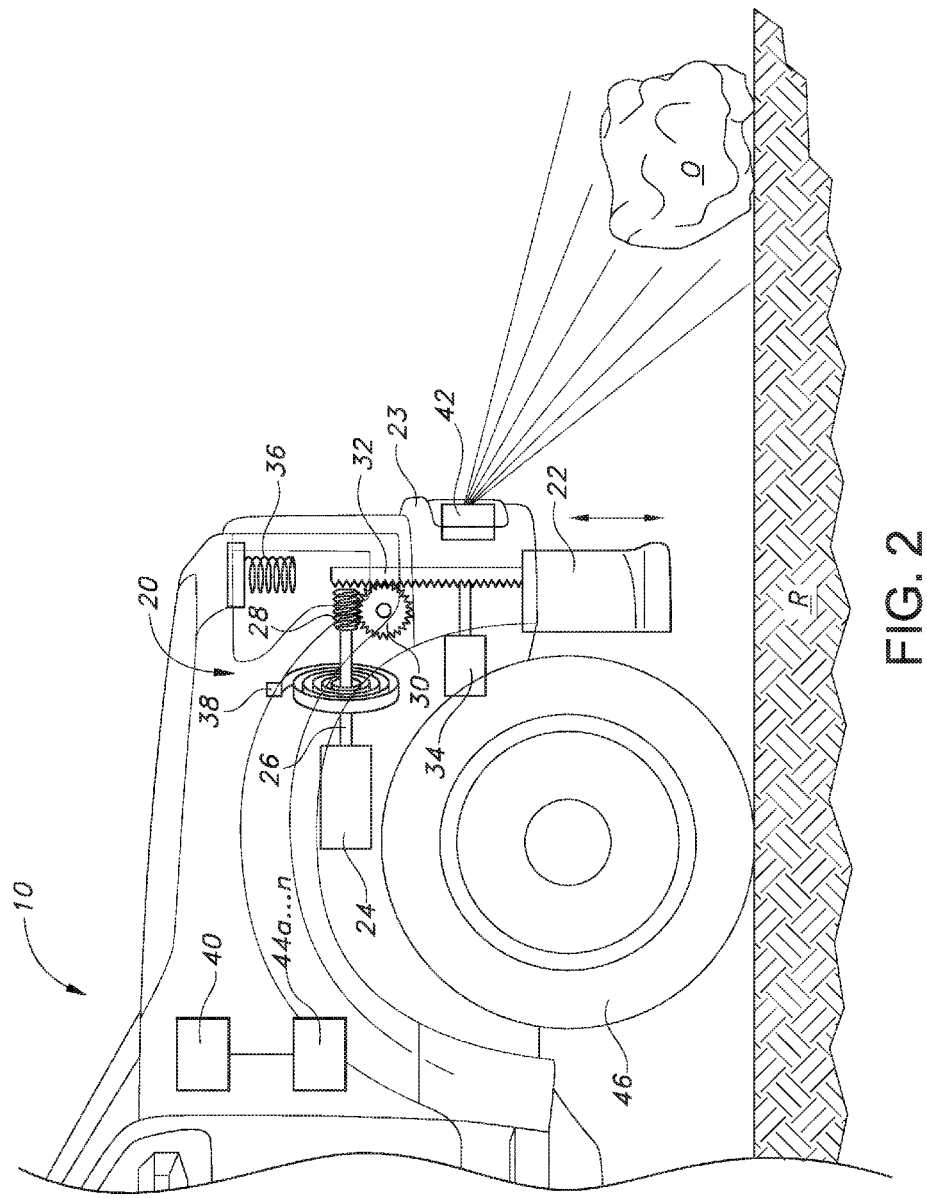
FIG. 2 shows a side view of a vehicle including a deployed front air dam assembly according to the present disclosure.

To solve this problem, with reference to FIG. 2 there is provided a system 20 for deploying and raising an air dam 22. As is known, the air dam 22 is typically disposed substantially adjacent to a bumper 23 of the vehicle 10, and may be disposed partially or completely behind the bumper 23 depending on whether the air dam 22 is partially or fully deployed. The system 20 includes a deploying mechanism for raising and lowering the air dam 22 to a desired height/ground clearance. The system 20 further includes a separate mechanism for rapidly raising the air dam 22 when conditions dictate, for example when the vehicle is approaching an obstacle O in the road R, a rough road surface R, and the like.

Figure 4:
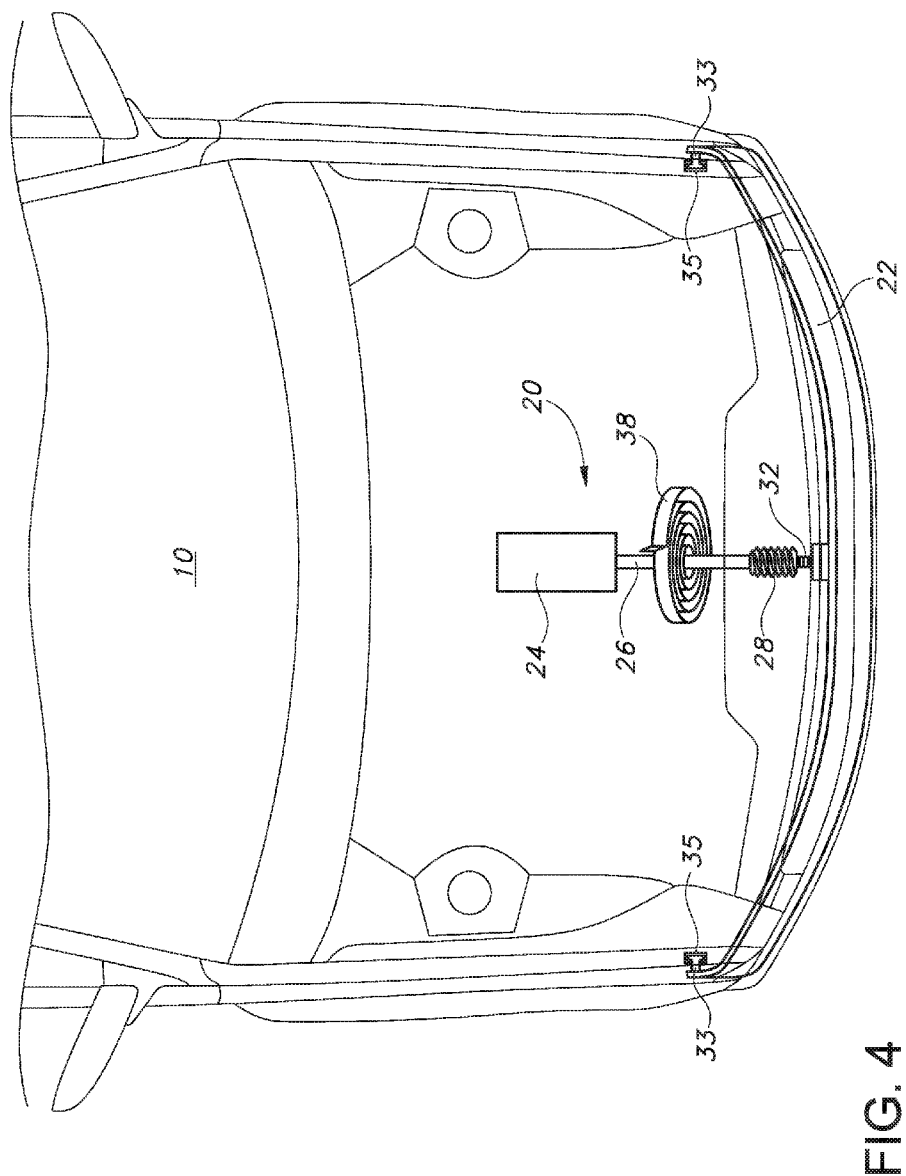
FIG. 4 shows a top view of the front air dam assembly of FIG. 2.

In one embodiment, the described system 20 deploying mechanism includes a motor 24 operatively connected to a worm gear 28 by way of an arm 26. The worm gear 28 in turn drives a second gear 30. The teeth of second gear 30 mesh with teeth associated with a portion of the air dam 22, in the depicted embodiment being disposed in a strut 32. It will be appreciated that alternative configurations are contemplated, including without limitation defining teeth in a surface of the air dam 22. The action of motor 24 turning arm 26 clockwise or counter-clockwise will respectively raise or lower air dam 22 between a raised position and one or more desired deployed positions (see arrows). The opposed ends of air dam 22 may include rails 33 that travel in cooperating slots, channels, or sleeves 35 associated with a portion of the frame (not shown) of vehicle 10 as the air dam 22 is raised and lowered (see FIG. 4). A locking mechanism 34 is provided to lock the air dam 22 in the raised or one or more deployed positions, as appropriate. Any number of suitable devices may serve as the locking mechanism 34, for example a locking solenoid or other type of controllable linear actuator, a friction clutch for preventing rotation of arm 26 or for preventing translation of strut 32 and/or another portion of air dam 22, and others. A damped spring 36 may be included to provide for a quieter operation during the raising of the air dam 22.

In turn, the system 20 includes a mechanism for rapidly raising the air dam 22 to a raised position determined to be sufficient to provide a desired higher ground clearance between a bottom of the air dam 22 and a surface of road R. It will be appreciated that the term "raised position" may mean a fully retracted position, i.e. raised as far as the raising mechanism permits, potentially such that the air dam 22 is disposed entirely or nearly entirely behind the vehicle bumper, to provide as much ground clearance as is possible. In alternative embodiments, "raised position" may mean raised to a specific predetermined height providing an increased ground clearance that is less than the maximum ground clearance available for the system. In yet other alternative embodiments, "raised position" may mean raised to a different position specifically calculated to provide a sufficiently higher ground clearance according to the situation encountered.

Figure 3:
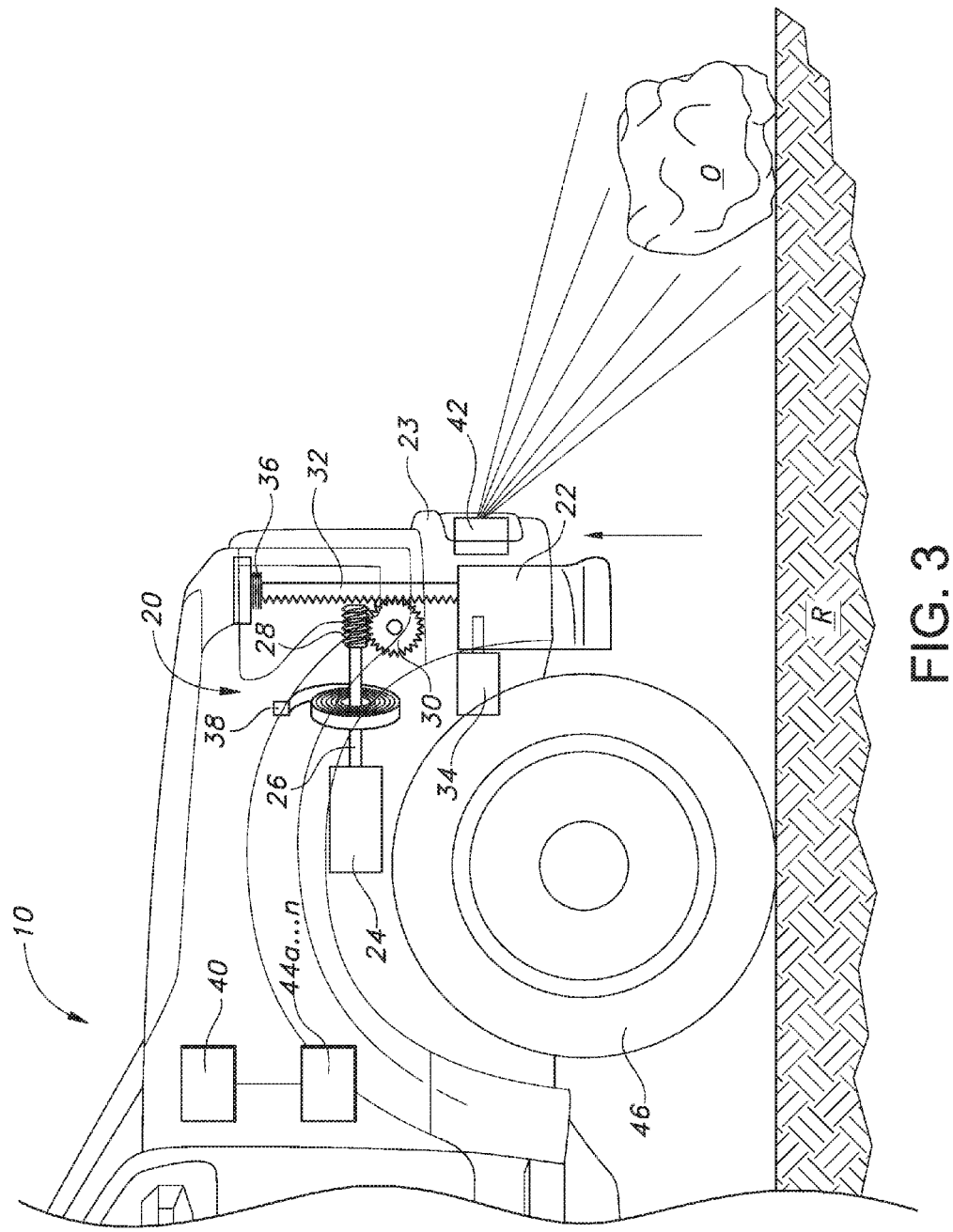
FIG. 3 shows the front air dam assembly of FIG. 2 in a raised configuration.

In one embodiment, the raising mechanism is a coiled spring 38 connected at a first end to arm 26 and at a second end to a frame member (not shown) of the vehicle. In the depicted embodiment, coiled spring 38 is a torsion spring, although of course alternative spring configurations can be adapted and so are contemplated for use herein. It will be appreciated that the coiled spring 38 will be under less tension when the air dam is in the raised position. As the arm 26 rotates in a first direction and the air dam 22 is deployed, the coiled spring 38 is placed under greater tension. When it is determined that the air dam 22 must be rapidly raised to avoid a rough road surface R or an obstacle O, for example, the locking mechanism 34 releases the air dam 22 and the coiled spring 38 returns to its original state of lesser tension, turning arm 26 (which may be configured to freely rotate when motor 24 is turned off), worm gear 28, and second gear 30 rapidly in a second direction opposite to the first direction to retract the air dam 22 (see FIG. 3).

Figure 5:
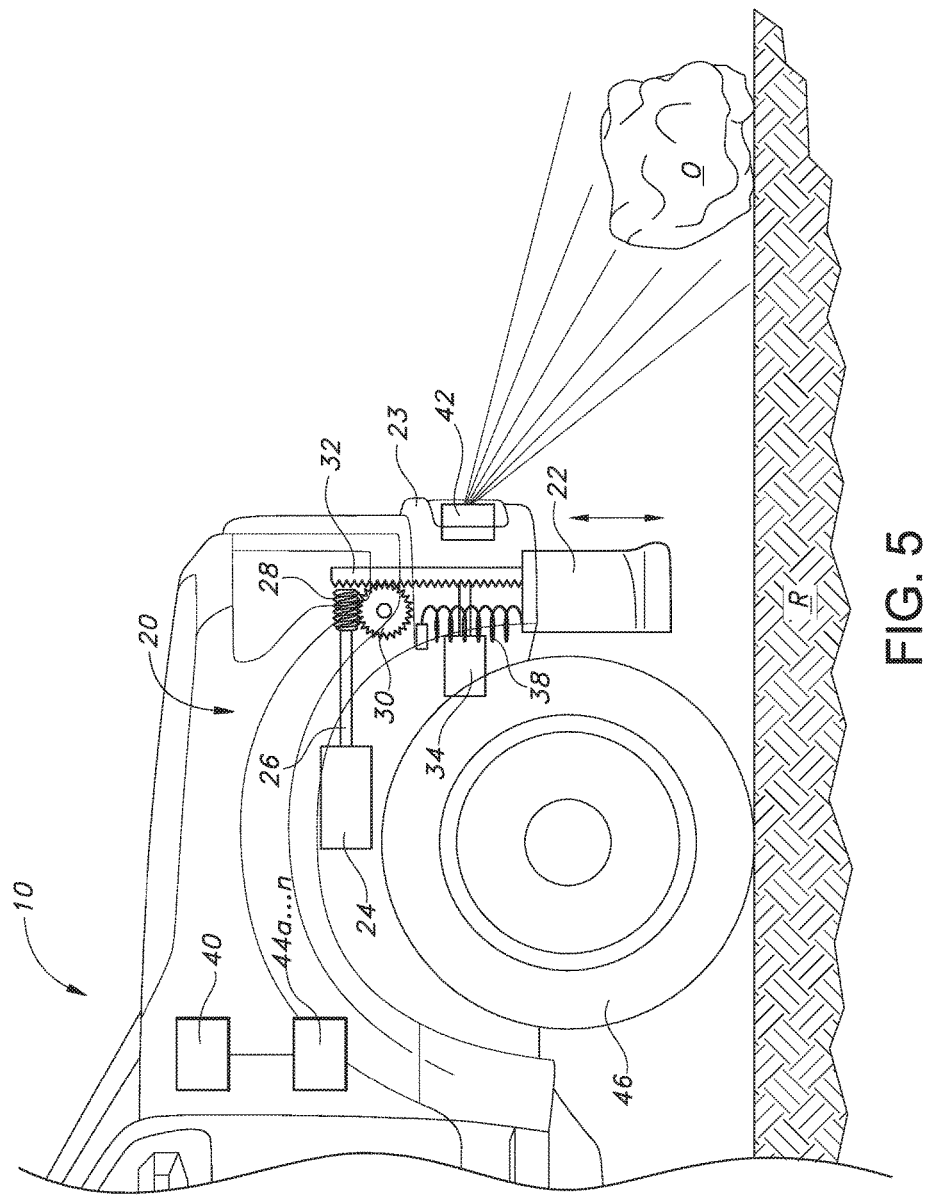
FIG. 5 shows a side view of a vehicle including an alternative embodiment of a front air dam assembly according to the present disclosure.

In an alternative embodiment (see FIG. 5), the coiled spring 38 may be directly connected at one end to a portion of the vehicle 10 frame (not shown) and at the opposed end directly to a portion of the air dam 22. For example, the opposed end of coiled spring 38 may be connected to a portion of the body of the air dam 22, or alternatively to the strut 32. When the air dam 22 is deployed, the coiled spring 38 is stretched and placed under tension. When the locking mechanism 34 releases, the coiled spring 38 returns to its original configuration and pulls directly on the air dam 22 to retract it. It will be appreciated that in this embodiment coiled spring 38 may have the tension coil spring configuration shown in FIG. 5, or may also be a torsion spring as described above.

The above-described mechanism could of course be manually controlled by an operator of the vehicle 10, and such manual controlling is contemplated for use herein. However, because of the limited reaction time that may be available to deal with a road obstacle, it is contemplated instead to provide systems for automated control of the air dam 22. In particular, with additional reference to FIG. 6 it is contemplated to provide an air dam controller 40 configured to automatically raise and lower the air dam 22 by the above-described mechanisms, and to rapidly retract the air dam 22 on encountering a rough road surface R or a road obstacle O, but also in the event of heavy steering or braking likely to cause the deployed air dam 22 to contact the road surface R. The air dam controller 40 may be configured to raise and/or lower air dam 22 to a desired deployed position according to a vehicle speed, determined best fuel economy, etc.

For example, it is known to provide controllers 40 including processors and memory which determine an air dam 22 height/ground clearance value providing a best fuel economy from stored pre-calibrated data (based on wind-tunnel testing/modelling, etc.) for a particular vehicle 10. This height/ground clearance value may be compared to another set of pre-calibrated data determining a minimum acceptable ground clearance assuming a smooth, unobstructed road. From these values, a highest clearance value is chosen and the controller 40 causes motor 24 to raise/lower the air dam 22 to that chosen highest clearance value, to provide a best compromise between optimal fuel economy, driving dynamics, and safety according to road conditions. Once the chosen highest clearance value has been determined to be stable for a predetermined time period (for example, once the vehicle has been traveling for 2 seconds), the locking mechanism 34 locks the air dam 22 in place and the motor 24 is turned off. This process may be repeated as necessary, for example at a beginning of a vehicle operation and/or as road conditions change, or at a next computer update event, to re-determine the best compromise between optimal fuel economy and safety according to road conditions.

Figure 6:
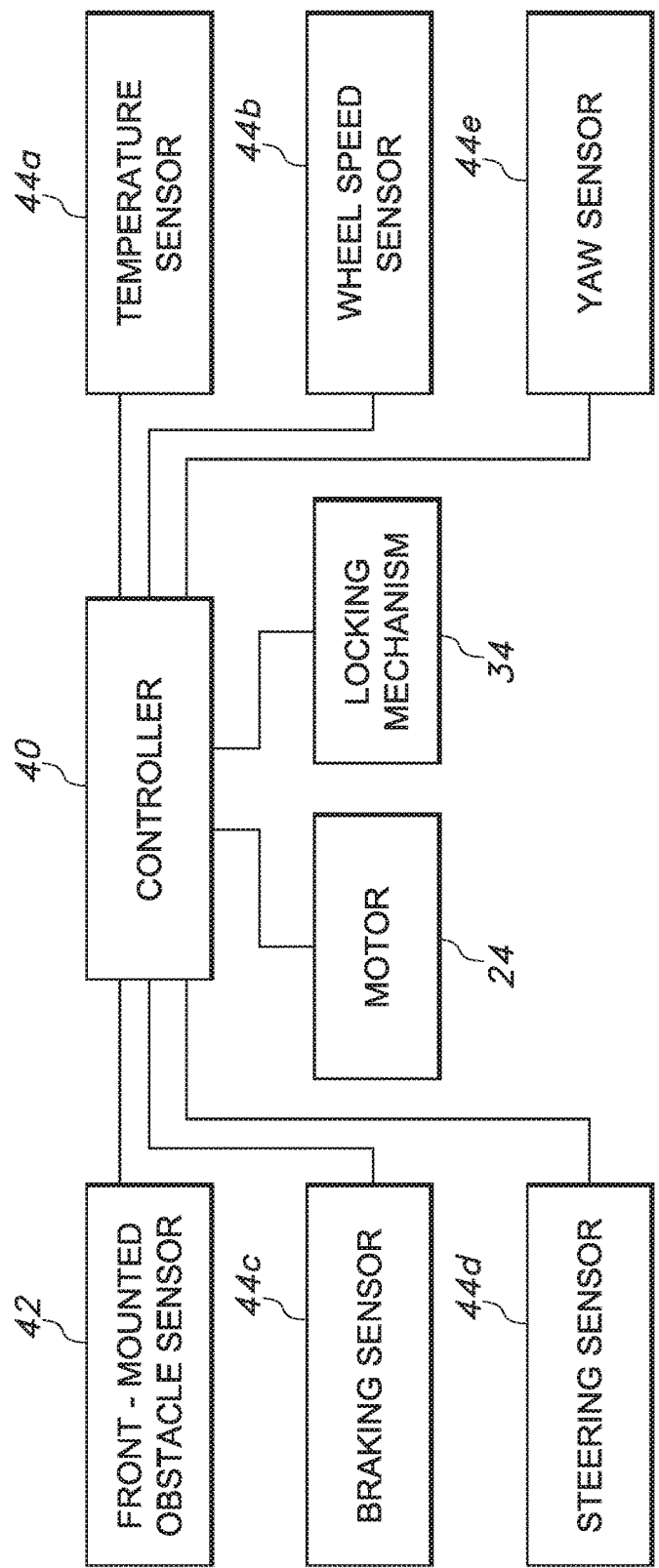
FIG. 6 shows a schematic depiction of a sensor array and controller for deploying and raising the front air dam assembly of the present disclosure.

The air dam controller 40 may also be associated with a variety of sensors, including front-mounted obstacle detecting sensors 42 and a variety of other sensors of known configuration and capacities, shown generically in the drawing figures as reference numerals 44a . . . 44n (see also FIG. 6). For example, in addition to the above calculations, controller 40 may be in communication with one or more temperature sensors 44a configured to determine an operating temperature of one or more underbody components of the vehicle 10, such as a power take-off unit (PTU; not shown) for transferring east-west front wheel drive power to the rear wheels of a four-wheel drive vehicle, or vice versa. The specific configuration of a temperature sensor is known, and need not be described fully herein. Controller 40 may determine an air dam 22 height/ground clearance value providing a best airflow for PTU cooling function from stored pre-calibrated data (based on tables of PTU temperature, ambient temperature, vehicle speed, etc.) for a particular vehicle 10.

Figure 7:
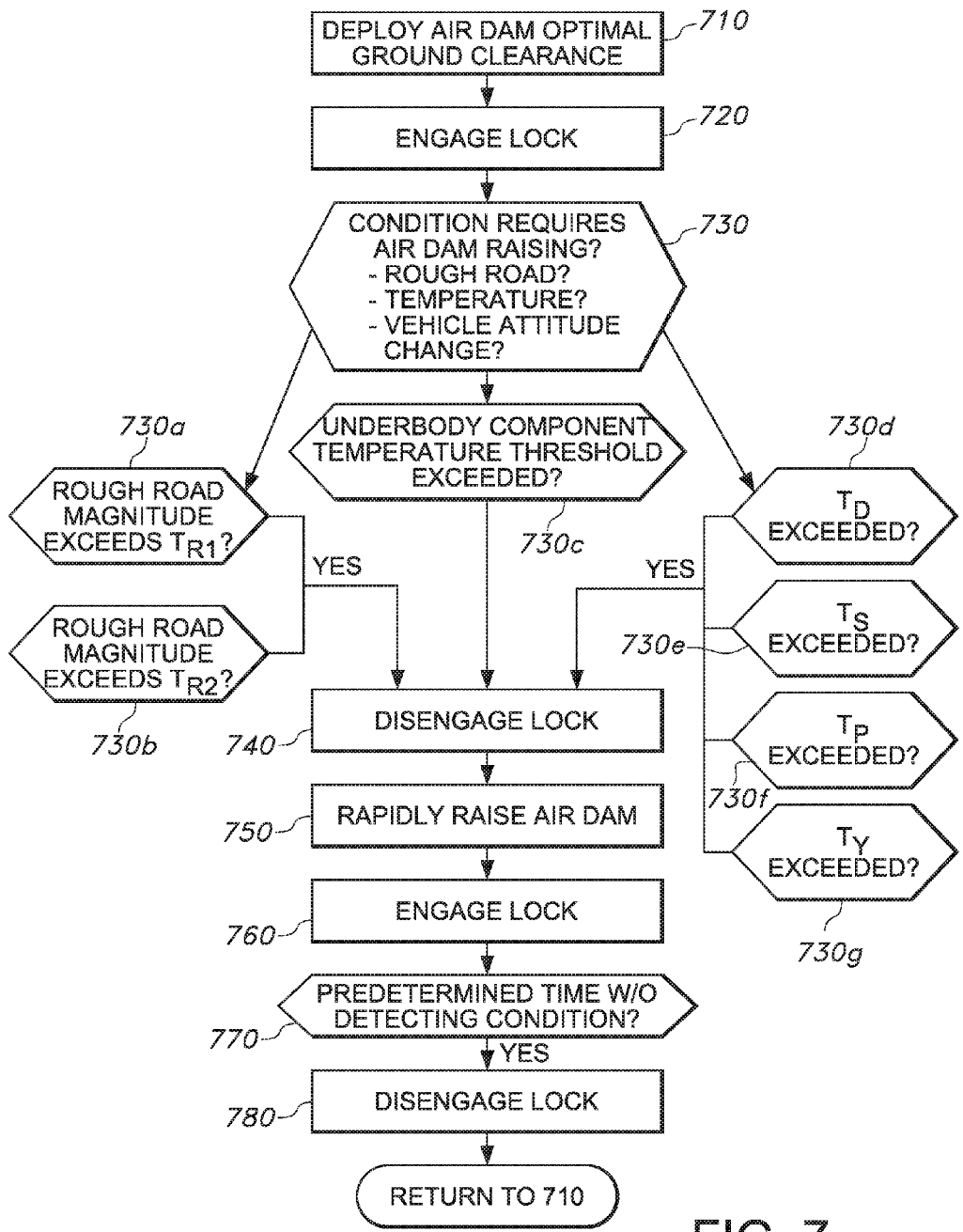
FIG. 7 illustrates in flow chart form a method for controlling a position of the front air dam of the present disclosure.

From these values, the controller 40 causes motor 24 to raise/lower the air dam 22 to that chosen best cooling height/ground clearance value (see also FIG. 7, step 710). Once the chosen best cooling height/ground clearance value has been determined to be stable for a predetermined time period, the locking mechanism 34 locks the air dam 22 in place (FIG. 7, step 720) and the motor 24 is turned off. The controller 40 then periodically receives from various sensors described below, or may periodically query the sensors for, inputs indicative of a condition requiring a raising of the air dam 22 to a position requiring a higher height/ground clearance compared to the chosen best cooling height/ground clearance value (FIG. 7, step 730).

For example, if during operation of the vehicle 10 the temperature sensor 44a indicates that a temperature of the PTU or other underbody component is approaching or has exceeded a predetermined maximum allowable temperature threshold (perhaps due to the reduced airflow around the component or more severe vehicle operating conditions; see FIG. 7 step 730c), controller 40 may turn motor 24 on and cause motor 24 to raise/lower the air dam 22 to a determined greater height/ground clearance value to increase underbody airflow/cooling. Alternatively, when temperature sensor 44a indicates that a temperature of the PTU or other underbody component is approaching or has exceeded a predetermined maximum allowable temperature, controller 40 may simply cause locking mechanism 34 to release without turning motor 24 on, allowing coiled spring 38 to rapidly raise the air dam 22 to the chosen best cooling height/ground clearance value. This process may be repeated as necessary, for example as PTU temperature, ambient temperature, etc. A similar process is contemplated in place of or in addition to the foregoing, using temperature sensors 44a associated with other vehicle 10 components, for example electric motors associated with electronic power assist steering mechanisms (EPAS; which require enhanced cooling compared to non-EPAS vehicles), the vehicle transmission, the PTU, an axle, a transfer case, a 4×4 transfer case, a brake assembly, a battery, and others. This can be done by the controller 40 referencing one or more stored values for each sub-system or component where the values may represent vehicle underbody component maximum allowable operating temperatures.

The foregoing description is directed primarily to mechanisms and systems for raising/lowering an air dam 22 in non-emergency situations, that is, during situations commonly encountered during normal operation of the vehicle 10 and not requiring a rapid response, and as such the described raising/lowering of the air dam 22 could be accomplished by way of motor 24/arm 26. However, it may be necessary to rapidly raise the air dam 22 in an emergency-type situation or a situation providing a limited reaction time, such as when the vehicle 10 is approaching a road obstacle O. Therefore, in another aspect of the present disclosure a vehicle 10 is provided with front-mounted obstacle sensors 42 configured to send a signal to air dam controller 40. These front-mounted obstacle sensors may be based on a variety of technologies, including front-mounted collision warning/avoidance systems based on cameras, lasers (LIDAR), radar, sonar, ultrasound, and others as are known in the art. Such systems are known, and the specific construction of such need not be described in detail herein.

In one embodiment, one or more front-mounted obstacle sensors 42 are provided which can detect an obstacle O in front of the moving vehicle 10, for example an obstacle O determined by sensor 42 to be of a sufficient height that it will be struck or is likely to be struck by air dam 22 within in a predetermined time frame, for example in 0.5-1 seconds. On detection of this road condition, a signal is sent to controller 40, which causes the locking mechanism 34 to release. The coiled spring 38 (which as described above is kept under tension when the air dam 22 is in a deployed configuration) operates to rotate arm 26 (which as noted above may be configured to freely rotate when controller 40 has turned motor 24 off) and associated worm gear 28/second gear 30 to rapidly (less than 0.5 seconds) raise the air dam 22 to a fully raised position (see FIG. 3) or to a new determined ground clearance value providing a greater ground clearance. The locking mechanism 34 then re-engages to lock the air dam 22 at the new height.

If no obstacles are detected for a predetermined time period (for example, 10 seconds), the controller 40 causes locking mechanism 34 to release the air dam 22, and simultaneously or previously turns motor 24 on, and causes motor 24 to slowly return air dam 22 to the previous determined optimal height/ground clearance. It will be appreciated that the specific operations of taking information provided by the obstacle sensor 42 and converting that information to a determination that the vehicle 10 is approaching an obstacle O requiring action is under the control of particular logic and processors, the full description of which exceeds the scope of the present disclosure.

Likewise, in yet another embodiment, sensors may communicate with controller 40 to determine whether air dam 22 should be rapidly raised in response to a determination of rough road conditions. A number of such systems are known in the art, for example the system disclosed in U.S. Pat. No. 8,060,275 to the present Assignee Ford Global Technologies, LLC for Rough Road Detection System used in an On-board Diagnostic System, the disclosure of which is incorporated herein by reference. In brief, wheel sensors 44b may be provided associated with the vehicle 10 braking system, such as anti-lock braking system sensors configured to detect a wheel 46 speed (rpm) or acceleration. Signals from sensor 44b indicative of high frequency oscillations in wheel 46 speed or acceleration signals are interpreted as rough road conditions causing or potentially causing vehicle 10 up/down and side-to-side accelerations which could cause air dam 22 to contact the road surface R. As other non-limiting examples, vibration sensors, vehicle suspension sensors, and others may be used to provide a signal indicative of a rough road surface.

On receipt of these signals indicative of a rough road, controller 40 may, from stored pre-calibrated data (based on tables of minimum acceptable air dam 22 ground clearance and rough road "magnitude," that is, the road conditions determined in a controlled environment to cause particular magnitudes of vehicle 10 vibration, suspension travel, and/or vehicle up/down and side-to-side accelerations) determine an air dam 22 height/ground clearance value providing a best ground clearance value for a particular rough road magnitude. From these values, the controller 40 causes locking mechanism 34 to release without activating motor 24, and coiled spring 38 rapidly raises air dam 22 to that chosen best ground clearance value, whereupon locking mechanism 34 re-engages to lock air dam 22 at that chosen best ground clearance value, or may fully retract. When sensor 44b indicates that road conditions have changed (i.e., as high frequency oscillations in wheel 46 speed signals decrease indicating that road surface R is smooth again), controller 40 causes motor 24 to lower air dam 22 to the previous ground clearance value.

In one possible embodiment (see FIG. 7 step 730a; see also FIGS. 8 and 9), the controller 40 may be configured to release the locking mechanism 34 to rapidly raise the air dam 22 (FIG. 7, steps 740-750) when a rough road detection system such as that disclosed in U.S. Pat. No. 8,060,275 (and as summarized above) determines that a road surface condition exceeds a first predetermined roughness threshold $T_{R1}$. In one possible embodiment (see FIG. 8), a rough road detection system algorithm adjusts a Rough Road Value between 0 and 1 where zero is smooth road and 1 is very rough road or terrain. As described above, the controller 40 periodically queries for or automatically receives inputs indicative of conditions requiring rapidly raising air dam 22 (FIG. 7, step 730) such as rough road conditions exceeding a predetermined threshold (FIG. 7, step 730a). The controller 40 increases the Rough Road Value as the wheel/vehicle sensors 44b detect wheel 46/vehicle 10 movements that are indicative of wheel movements encountered while traversing rougher terrain. If the Rough Road Value exceeds the calibrated predetermined threshold $T_{R1}$, as shown in FIG. 8, then the controller 40 commands the release of the locking mechanism 34 so that the air dam 22 quickly retracts (see FIG. 9, see also FIG. 7 steps 740-750). On determining that the road surface condition no longer exceeds the predetermined roughness threshold $T_{R1}$ for a predetermined period of time, the controller 40 then causes the locking mechanism 34 to release the air dam 22 and turns motor 24 on to lower the air dam 22 to the previous determined optimal height/ground clearance (FIG. 9; see also FIG. 7, steps 770-780).

In another possible embodiment (see FIG. 7 step 730b), the controller 40 may be configured to release the locking mechanism 34 to raise the air dam 22 when a rough road detection system such as that disclosed in U.S. Pat. No. 8,060,275 determines that a road surface condition exceeds a second predetermined roughness threshold $T_{R2}$ that is less than the first predetermined threshold $T_{R1}$, but is exceeded for a longer period of time. This is done by inferring a length of time that rough road conditions are detected by calculating a Rough Road Moving Average (RRMA) which is provided as a running average over a window spanning a previous N points of computer Rough Road Value data, as defined above. In one possible embodiment, the running average is expressed as the sum of the last N Rough Road Value data points divided by N, with N being a predetermined value. For example if N is preset at 20, the Rough Road values from the last 20 background loops are used. Explained as a simplified algorithm with N set at 20, RRMA=sum(Rough Road Values for last 20 data events).

This determined RRMA value is compared to the second predetermined roughness threshold $T_{R2}$ stored in memory. If the calculated RRMA>$T_{R2}$, then the controller 40 commands the release of the locking mechanism 34 so that the air dam 22 quickly retracts (see FIG. 9, see also FIG. 7 steps 740-750).

The first predetermined threshold $T_{R1}$ and the second predetermined threshold $T_{R2}$ may be determined by the controller 40/rough road detection system by referencing a table of incrementally decreasing thresholds vs incrementally increasing periods of time. In turn, on determining that the road surface condition no longer exceeds the first predetermined roughness threshold or the second predetermined roughness threshold for a predetermined period of time, the controller 40 then causes the locking mechanism 34 to release the air dam 22 and turns motor 24 on to lower the air dam 22 to the previous determined optimal height/ground clearance (FIG. 7, steps 770-780. In one possible embodiment the predetermined period of time may be 30 seconds, although of course other time periods are contemplated according to anticipated rough road conditions (temporary rough road conditions on paved roadways versus longer-term rough road conditions on non-paved surfaces, etc.).

In still yet another embodiment (see FIG. 7), a determination of whether and/or how much the air dam 22 should be rapidly raised may be made in response to a determination by the controller 40 of a change in a vehicle attitude condition, for example a magnitude of vehicle forward pitch and yaw caused by various actions such as heavy braking, steering, etc. In this embodiment, various sensors may communicate with controller 40 to determine whether and/or how much air dam 22 should be raised in response to a determination of sudden or heavy braking or steering. As is known and as is briefly described above, sudden braking or steering to avoid an obstacle may cause the vehicle nose to dip or roll, i.e. creating a forward pitch or deceleration which may cause a portion of the front air dam to strike the road surface and cause damage and potential impairment of vehicle stability and handling. To address this situation, additional sensors may be provided associated with the vehicle 10 braking system and/or steering system. These sensors are configured to detect sudden and/or heavy application of braking or steering operations/sudden changes in steering angle indicative of sudden and emergency braking and/or steering.

For example, on receipt of a signal from one or more braking sensors 44c indicative of a braking rate that would cause enough forward pitch or forward roll that would require raising the air dam, controller 40 may determine a predicted reduction in air dam 22 ground clearance associated with a specific vehicle 10 deceleration from stored pre-calibrated data (based on tables of vehicle 10 deceleration vs. front end drop, that is, the amount of vehicle 10 front end drop associated with a specific speed of deceleration). If the predicted reduction in air dam 22 ground clearance will be less than a predetermined minimum acceptable ground clearance, the controller 40 causes locking mechanism 34 to release, and coiled spring 38 rapidly raises air dam 22 to that predetermined minimum acceptable ground clearance, whereupon locking mechanism 34 re-engages to lock air dam 22 at that predetermined minimum acceptable ground clearance. When braking sensor 44c indicates that the emergency braking operation has ceased, controller 40 causes motor 24 to lower air dam 22 to the previous ground clearance value.

In one possible embodiment (see FIG. 7 step 730d and FIG. 10), the controller 40 may cause the locking mechanism 34 to release the air dam 22 (FIG. 7 steps 740-750, see also FIG. 9) when braking sensors 44c indicate that a braking force has been applied that exceeds a deceleration threshold $T_D$. In one possible embodiment illustrated in FIG. 10, if a requested deceleration rate from brake pedal application exceeds a deceleration threshold $T_D$ of 0.3 g, then controller 40 commands quick release of the locking mechanism 34. In another possible embodiment which may be applied as an alternative to or in addition to the deceleration threshold $T_D$, a vehicle pitch may be detected (see FIG. 7 step 730f and FIG. 10) via a six axis or other accelerometer type provided as part of the existing vehicle stability control system, and the locking mechanism 34 is released by the controller 40 when the detected pitch exceeds a pitch threshold $T_P$ of 5 degrees forward pitch. Of course, alternative threshold values for deceleration and/or pitch are contemplated according to vehicle type, anticipated operation conditions, etc.

Likewise, on receipt of a signal from steering sensors 44d or yaw sensors 44e indicative of emergency steering operations, controller 40 may determine a predicted reduction in air dam 22 ground clearance associated with the determined vehicle side drop from stored pre-calibrated data (based on tables of vehicle 10 roll acceleration vs. side drop, that is, the amount of vehicle 10 side drop associated with a specific roll acceleration associated with a particular steering operation). If the predicted reduction in air dam 22 ground clearance will be less than a predetermined minimum acceptable ground clearance, the controller 40 causes locking mechanism 34 to release, and coiled spring 38 rapidly raises air dam 22 to that predetermined minimum acceptable ground clearance, whereupon locking mechanism 34 re-engages to lock air dam 22 at that predetermined minimum acceptable ground clearance. When steering sensor 44d indicates that the emergency steering operation has ceased, controller 40 may turn on motor 24 and cause motor 24 to lower air dam 22 to the previous ground clearance value.

In one possible embodiment (see FIG. 7 step 730e), the controller 40 may cause the locking mechanism 34 to release the air dam 22 (FIG. 7 steps 740-750) when steering sensors 44d indicate that difference in a current steering position minus a filtered steering position exceeds a threshold. In one possible embodiment illustrated in FIG. 11, if a measured steering angle (or a desired steering motion in an autonomous vehicle) exceeds a steering threshold $T_S$ of 70 degrees in less than a second, then the controller 40 commands quick release of the locking mechanism 34. In another possible embodiment which may be applied as an alternatively to or in addition to the steering threshold $T_S$ or the deceleration threshold $T_D$, a side roll (FIG. 7, step 730g) may be detected by a yaw sensor 44e such as a six axis accelerometer provided as part of the existing vehicle stability control system, and the locking mechanism 34 is released by the controller 40 when a detected side roll value exceeds a yaw threshold $T_Y$ of 5 degrees.

Thus, by the above-described structures and mechanisms, systems and methods are provided for normal raising and lowering of a front air dam in response to determined optimums of fuel economy, underbody cooling requirements, etc. At the same time, reliable, simple, and robust systems and methods are provided for rapidly raising the front air dam to provide additional ground clearance in unexpected situations, such as encountering a road obstacle, rough road conditions, heavy braking and/or steering etc. Obvious modifications and variations are possible in light of the above teachings. All such modifications and variations are within the scope of the appended claims when interpreted in accordance with the breadth to which they are fairly, legally and equitably entitled.

What is claimed:

1. A method for controlling a vehicle air dam, comprising:
by a controller, deploying an air dam having a rail at each lateral end thereof slidingly engaging cooperating slots, channels, or sleeves associated with a portion of a frame of the vehicle to a first position selected from a stored look-up table of vehicle speed versus aerodynamic drag;
by the controller, determining one or more of a vehicle attitude condition, a rough road condition, or an excessive vehicle underbody component temperature condition; and
by the controller in response to receiving a signal indicative of the vehicle attitude condition, the rough road condition, or the excessive vehicle underbody component temperature condition, disengaging a locking mechanism and by a spring-actuated raising mechanism rapidly raising the air dam to a second position providing a greater ground clearance value than the first position.

2. The method of claim 1, including by the controller engaging the locking mechanism after deploying the air dam to the first position and/or rapidly raising the air dam to the second position.

3. The method of claim 1, wherein the rough road condition is one of a detected road obstacle or a detected rough road surface condition.

4. The method of claim 1, wherein the vehicle attitude condition is determined by one or more inputs provided to the controller and indicative of one or more of a braking force exceeding a predetermined braking force threshold, a vehicle yaw condition exceeding a predetermined yaw threshold, and a steering action exceeding a predetermined steering action threshold.

5. The method of claim 4, wherein the one or more inputs are provided by one or more of a vehicle braking sensor, a vehicle steering sensor, and a vehicle yaw sensor.

6. The method of claim 1, wherein the vehicle underbody component is selected from one or more of the group consisting of a transmission, a power-take-off-unit, an axle, a transfer case, a 4×4 transfer case, a brake assembly, and a battery.

7. The method of claim 6, wherein a temperature input indicative of the excessive vehicle underbody component temperature condition is provided by one or more temperature sensors.

8. The method of claim 7, further including, by the controller on receiving the temperature input, rapidly raising the air dam to the second position.

9. The method of claim 8, including by the controller determining the excessive vehicle underbody component temperature condition by determining a temperature exceeding a predetermined temperature threshold.

10. The method of claim 3, further including providing a vehicle comprising a forward-sensing sensor system including one or more of a camera-based forward-sensing system, a laser-based forward-sensing system, a sonar-based forward-sensing system, an infrared-based forward-sensing system, an ultrasonic wave-based forward-sensing system, and a radar-based forward-sensing system.

11. The method of claim 10, further including, by the controller in response to a signal received from the forward-sensing sensor system indicative of one or both of the road obstacle or a first road surface condition exceeding a first predetermined roughness threshold, rapidly raising the air dam by the spring-actuated raising mechanism to the second position.

12. The method of claim 11, further including, by the controller in response to a signal received from the forward-sensing sensor system indicative of a second road surface condition exceeding a second predetermined roughness threshold that is less than the first predetermined roughness threshold for a predetermined period of time, rapidly raising the air dam by the spring-actuated raising mechanism to the second position.

13. The method of claim 12, further including, on not detecting the road obstacle or the first or second road surface condition for a predetermined period of time, deploying the air dam to the first position.

14. A method for controlling a vehicle air dam, comprising:
by a controller, deploying an air dam having a rail at each lateral end thereof slidingly engaging cooperating slots, channels, or sleeves associated with a portion of a frame of the vehicle to a first position selected from a stored look-up table of vehicle speed versus aerodynamic drag;
by the controller, determining one or more of a threshold-exceeding vehicle attitude condition, a threshold-exceeding rough road condition, or a threshold-exceeding excessive vehicle underbody component temperature condition; and
by the controller, disengaging a locking mechanism and by a spring-actuated raising mechanism rapidly raising the air dam to a second position providing a greater ground clearance value than the first position.

15. The method of claim 14, wherein the threshold-exceeding vehicle altitude condition is determined by one or more braking sensor inputs indicative of one or more of a braking force exceeding a predetermined braking force threshold, by one or more pitch sensor inputs indicative of a vehicle forward rod condition exceeding a predetermined roll threshold, by one or more yaw sensor inputs indicative of a vehicle yaw condition exceeding a predetermined yaw threshold, and by one or more steering sensor inputs indicative of a steering action exceeding a predetermined steering action threshold.

16. The method of claim 15, including by the controller receiving a signal from one or more braking sensors indicative of an applied braking force exceeding a predetermined deceleration threshold $T_D$ of 0.3 g, by the controller disengaging the locking mechanism and by the spring-actuated raising mechanism rapidly raising the air dam to the second position.

17. The method of claim 15, including by the controller receiving a signal from one or more pitch sensors indicative of a vehicle pitch condition exceeding a predetermined forward pitch threshold $T_P$ of 5 degrees, by the controller disengaging the locking mechanism and by the spring-actuated raising mechanism rapidly raising the air dam to the second position.

18. The method of claim 15, including by the controller receiving a signal from one or more yaw sensors indicative of a vehicle side roll condition exceeding a predetermined yaw threshold $T_Y$ of 5 degrees, by the controller disengaging the locking mechanism and by the spring-actuated raising mechanism rapidly raising the air dam to the second position.

19. The method of claim 15, including by the controller receiving a signal from one or more steering sensors indicative of vehicle steering action exceeding a predetermined steering threshold $T_S$ of 70 degrees over a time period of up to 1 second, by the controller disengaging the locking mechanism and by the spring-actuated raising mechanism rapidly raising the air dam to the second position.

* * * * *